United States Patent
Maccaferri et al.

(10) Patent No.: US 10,459,083 B2
(45) Date of Patent: Oct. 29, 2019

(54) 3D SCANNER WITH ACCELEROMETER

(71) Applicant: Kulzer GmbH, Hanau (DE)

(72) Inventors: Loris Maccaferri, Bologna (IT); Andrea Grandi, Bologna (IT); Valerio Zaminato, Padua (IT)

(73) Assignee: Kulzer GmbH, Hanau (DE)

( * ) Notice: Subject to any disclaimer, the term of this patent is extended or adjusted under 35 U.S.C. 154(b) by 31 days.

(21) Appl. No.: 15/862,865

(22) Filed: Jan. 5, 2018

(65) Prior Publication Data

US 2018/0246210 A1    Aug. 30, 2018

(30) Foreign Application Priority Data

Feb. 27, 2017    (EP) ..................................... 17158105

(51) Int. Cl.
*G06K 9/00*    (2006.01)
*G01S 17/06*   (2006.01)
(Continued)

(52) U.S. Cl.
CPC ............ *G01S 17/06* (2013.01); *G01B 11/002* (2013.01); *G01B 21/20* (2013.01); *G01S 7/4817* (2013.01);
(Continued)

(58) Field of Classification Search
CPC ....... G01S 17/06; G01S 7/4817; G01B 11/26; G01B 21/22; G01B 5/0004;
(Continued)

(56) References Cited

U.S. PATENT DOCUMENTS 9,683,837 B2    6/2017  Siercks
2002/0135782 A1*  9/2002  Valentin ................. G01B 21/30
                                               356/616
(Continued)

FOREIGN PATENT DOCUMENTS

EP    2400261 A1    12/2011
EP    3 023 736      5/2016
(Continued)

OTHER PUBLICATIONS

Extended European Search Report in ER Application No. 17158105.1 dated Aug. 17, 2017, 7 pages.
(Continued)

*Primary Examiner* — Samir A Ahmed
(74) *Attorney, Agent, or Firm* — Marshall, Gerstein & Borun LLP

(57) ABSTRACT

Disclosed is a 3D scanner comprising at least one scanning module for acquiring three-dimensional coordinates of a surface of an object and a positioning device on which the object is placeable or fixable, whereby the positioning device is movable relative to the at least one scanning module, and the 3D scanner further comprising at least one accelerometer, which is configured to measure a change of the position of the positioning device relative to the scanning module, and a first processing unit which is connected to the at least one scanning module and to the positioning device for receiving data.

Also disclosed is a method for scanning a surface of an object to acquire three dimensional (3D) coordinates of the surface.

19 Claims, 5 Drawing Sheets

(51) Int. Cl.
*G02B 26/10* (2006.01)
*G01S 7/481* (2006.01)
*G06T 7/521* (2017.01)
*G01B 21/20* (2006.01)
*G01B 11/00* (2006.01)
*G02B 27/22* (2018.01)

(52) U.S. Cl.
CPC ............ *G02B 26/10* (2013.01); *G02B 27/22* (2013.01); *G06T 7/521* (2017.01)

(58) Field of Classification Search
CPC .. G01B 11/2545; G01B 21/20; G01B 11/002; G01B 2210/58; G06T 7/70; G06T 7/521; G02B 26/10; G02B 27/22
See application file for complete search history.

(56) References Cited

U.S. PATENT DOCUMENTS

| | | | | |
|---|---|---|---|---|
| 2007/0266781 | A1* | 11/2007 | Nemoto | G01B 3/008 73/105 |
| 2008/0065341 | A1* | 3/2008 | Ishikawa | G01B 21/045 702/95 |
| 2011/0270562 | A1 | 11/2011 | Ito et al. | |
| 2012/0105867 | A1* | 5/2012 | Komatsu | G01B 11/25 356/610 |
| 2013/0100282 | A1 | 4/2013 | Siercks | |
| 2013/0133168 | A1 | 5/2013 | Yamaguchi | |
| 2013/0215258 | A1* | 8/2013 | Gaglin | H04N 7/18 348/87 |
| 2013/0226344 | A1* | 8/2013 | Wong | G05D 1/024 700/258 |
| 2015/0015701 | A1* | 1/2015 | Yu | H04N 5/2259 348/136 |
| 2016/0169659 | A1 | 6/2016 | Steffey et al. | |
| 2016/0173855 | A1 | 6/2016 | Michel et al. | |
| 2016/0245918 | A1 | 8/2016 | Becker et al. | |

FOREIGN PATENT DOCUMENTS

| | | |
|---|---|---|
| JP | 2011-232101 A | 11/2011 |
| KR | 10-2013-0032351 A | 4/2013 |
| KR | 2016-0105259 A | 9/2016 |

OTHER PUBLICATIONS

Notice of Reasons for Rejection in JP Application No. 2017-243881 dated Jun. 4, 2019, 3 pages.
Notice of Preliminary Rejection in KR Application No. 10-2018-0021079 dated Nov. 28, 2018, 7 pages.
Office Action in EP Application No. 17158105.1 dated Apr. 11, 2019, 5 pages.

* cited by examiner

3D SCANNER WITH ACCELEROMETER

BACKGROUND OF THE INVENTION

Field of the Invention

The invention relates to a 3D scanner comprising at least one scanning module for acquiring 3D coordinates of a surface of an object. The invention also relates to a method for scanning a surface of an object to acquire three dimensional (3D) coordinates of the surface.

Related Technology

Three dimensional scanners (3D scanners) for scanning the 3D surfaces of objects are widely used. 3D scanners are devices which measure the coordinates (X, Y, Z) for each point or a multitude of points of the surface of an object. EP 3 081 980 A1 discloses an optical scan device and illumination device using a rotary shaft to rotate an anisotropic diffusion surface while a coherent light beam is illuminated on the anisotropic diffusion surface. A method and system for acquiring 3D coordinates of a surface of an object by use of a laser is disclosed by US 2016/169 659 A1. A laser scanner measuring 3D coordinates from two positions including at least one accelerometer and gyroscope is known from US 2016/245 918 A1. Such 3D scanners are and can be used only to scan a distanced object in an environment. A precise measurement of a surface of an object is not possible and hence such scanners cannot be used for precisely scanning the fine structure of a surface of an object. A 3D scanner comprising a structured-light projector is known from US 2016/173 855 A1. This 3D scanner is able to exactly measure the surface of the object contact free with a high precision by using a spectral decomposition. Nevertheless, even though the setup is costly and all parts need service to work complicated surfaces cannot be measured easily by this setup.

The result of such a measurement can be considered as a so-called "depth" map of the surface as an image since the depth (or distance) Z is generally expressed on the basis of the position (X, Y) in a Cartesian coordinate system. The depth maps so collected may then be used to construct three-dimensional synthetic images (digital objects) for various purposes.

Contact free 3D scanners are for example stereoscopic systems based on the use of two cameras as scanning modules, whereby the cameras being slightly spaced apart and pointing towards the same scene, for which the depth is deduced from the geometrical deformation between the two images.

So-called "structured-light" 3D scanners are a specific family of contact-free 3D scanners. These scanners are constituted by a light projector, generally produced on the principle of a video projector or constituted by a laser system generating interference fringes (for the so-called "phase-shifting" technique), and at least one camera as scanning module that is geometrically offset relative to the projector in order to produce a stereoscopic configuration. The projector projects a so-called "structured" pattern of light, having one or two geometrical dimensions (for example a line or an image), which may possibly be colored, onto the surface to measure. The camera, positioned at a distance from the projector called "stereo basis", acquires and records an image of the scene. The projected structured pattern is constituted by elementary patterns (also called "structured elements") appropriately chosen so that it is possible to detect them in the acquired image.

A disadvantage of these systems is that they are mostly complicated in use and a multitude of scans from different angles is needed to get coordinates if a large proportion of an object to be scanned shall be recorded in 3D or if complicated surfaces including undercuts shall be scanned. The object has to be repositioned manually or the scanning module moves around the object or the 3D scanner comprises a multitude of scanning modules scanning the object from different angles.

SUMMARY OF THE DISCLOSURE

It is therefore the problem of the invention to overcome the disadvantages of the prior art. Particularly, a 3D scanner shall be found, by which a large fraction of a surface of a relatively small object can be scanned in detail, even if the surface is complicated. The 3D scanner should be easy to use and be simple in setup and low priced if possible. In addition, the 3D scanner shall be able to be used flexible and fulfill individual requirements of the user.

The problems of the invention are solved by a 3D scanner comprising at least one scanning module for acquiring three-dimensional (3D) coordinates of a surface of an object and a positioning device on which the object is placeable or fixable, whereby the positioning device is movable relative to the at least one scanning module, and the 3D scanner further comprising at least one accelerometer, which is configured to measure a change of the position of the positioning device relative to the scanning module, a first processing unit which is connected to the at least one scanning module and to the positioning device for receiving data, and that one accelerometer of the at least one accelerometer is located in the positioning device or one accelerometer of the at least one accelerometer is located in the positioning device and another one is located in the scanning module.

Preferably, the at least one accelerometer is one accelerometer (in the meaning of a single accelerometer). Especially preferably this one accelerometer is located in the movable positioning device to detect movement of the positioning device relative to the other stationary parts of the 3D scanner. The data is received by the first processing unit from the scanning module and from the accelerometer. It is further preferred, that the at least one accelerometer is at least one gyroscope sensor. Gyroscope sensors are not expensive and easy to implement in scanners according to the invention. Furthermore, they deliver sufficient data to allow measuring the position of the parts of the sensor with good and sufficient accuracy.

The at least one accelerometer can be part of an inertial measurement unit (IMU). Nevertheless, preferably only one accelerometer is needed to keep the 3D scanner simple.

According to the invention, it is preferred that the positioning device is rotatable mounted around two different axes (X, Y), preferably two perpendicular axes (X, Y), or around three different axes (X, Y, Z), preferably three perpendicular axes (X, Y, Z), relative to the scanning module and the at least one accelerometer is configured to measure the rotation of the positioning device around these axes (X, Y) or (X, Y, Z) relative to the scanning module.

By that it is possible to scan the object from different sides without moving the scanning module and still scanning nearly the full surface of the object and also complicated surface structures of the object.

It is proposed that one accelerometer of the at least one accelerometer is located in the positioning device or one accelerometer of the at least one accelerometer is located in the positioning device and another one is located in the scanning module.

This ensures to precisely measure the relative movement between the scanning module and the positioning device. Thereby the exact perspective of the scanning module on the object can be determined and the coordinates of the surface of the object can be calculated from the different scans.

Furthermore, it can be provided that the at least one accelerometer is configured to measure any change of the of the position of the positioning device relative to the scanning module along defined and set degrees of freedom.

By use of the defined and set degrees of freedom for the relative movement it is possible to easily and exactly determine the change of the relative position of the positioning device relative to the scanning module.

A further development of the invention also proposes that, the first processing unit or a second processing unit is configured to correlate the acquired 3D coordinates from the scanning module with the position data received from the at least one accelerometer and/or is configured to correlate the 3D coordinates of different positions of the object with one another and/or is configured to calculate a combination of 3D coordinates by superimposing the acquired 3D coordinates of the object in different positions and by taking the change of the position of the object into account.

Hereby the calculation of resulting total surface coordinates can be widely automated and performed by the 3D scanner according to the invention. The so built 3D scanner does not only give the opportunity to calculate the 3D coordinates but readily calculates and presents the resulting 3D surface coordinates of the object.

Such 3D scanners according to the invention can further be designed for comprising a memory element in which the correlated data is stored and the first or second processing unit is configured to calculate a total surface of the object by matching the acquired coordinates of the surface of the object with respect to change of the position data measured by the accelerometer.

By this means the possibility to fully calculate the coordinates of the surface of the object by the 3D scanner is further completed.

In another embodiment of the 3D scanner, the positioning device is shiftable along two different directions or along three different directions relative to the scanning module and the 3D scanner comprises a linear accelerometer and a gyroscope sensor as the at least one accelerometer, the linear accelerometer being configured to measure the change of the position of positioning device caused by translation of the positioning device relative to the scanning module and the gyroscope sensor being configured to measure the change of an angle of a rotation of positioning device caused by rotation of the positioning device relative to the scanning module. Preferably the 3D scanner comprises an IMU containing the gyroscope sensor and the linear accelerometer.

Hereby larger objects or long objects can also be scanned by a compact 3D scanner according to the invention.

In a further development of the invention, it is proposed that the 3D scanner is a 3D dental scanner and at least one of a prosthetic tooth, a set of prosthetic teeth, a partial denture, a full denture, a denture base, a dental impression and a model of a part of an oral cavity of a patient is the object and is placeable on or fixable to the positioning device.

The 3D scanner according to the invention is particularly useful for scanning dentition or prosthetic teeth as it is compact and still able to scan the object from various positions. The part of an oral cavity is usually a model of the oral mucosa with or without residual dentition on which a denture base is to be placed, or a dental crown or dental bridge is to be placed, or in which dental implants are inserted.

In preferred 3D scanners, the positioning device is manually rotatable or rotatable and linear movable relative to the scanning module or the positioning device is manually rotatable or rotatable and linear movable along preset degrees of freedom relative to the scanning module.

Hereby a stationary scanning module can be used while the object is manually moved to scan the object from different angles. The operator of the 3D scanner often knows best which perspectives are needed or are particularly helpful to measure the relevant surfaces quick and efficient. Therefore, a manually movable positioning device can be useful gaining benefit from the understanding of the user. The scanning process is hereby easier and time saving.

It is further proposed that the 3D scanner is not comprising an actuator like a motor to move the positioning device relative to the scanning module.

By making not use of an actuator like a motor, the 3D scanner is less expensive but still suitable to fully scan all accessible surfaces of the object. Furthermore, there are less parts which can cause problems during the scanning process and which might fail and would need to be repaired.

Furthermore, according to the invention, it can be provided that the 3D scanner further comprising a timer and the first processing unit is configured to determine if there is a movement of the positioning device relative to the scanning module or if this movement exceeds a predefined angular and/or linear velocity limit by determining the change of the position measured by the at least one accelerometer or an IMU comprising the at least one accelerometer.

Hereby the 3D scanner is able to decide if a performed scan is usable. Alternatively or additionally, a scan during which the object has been moved could be corrected calculative to get a more precise result.

In preferred embodiments of the 3D scanner the first processing unit is configured to start and stop a scanning process and/or to determine if the 3D coordinates of the object are stored or not stored in a memory, based on a determination of a movement of the positioning device.

Hereby the 3D scanner is able to decide if a scanning process can be started. Alternatively or additionally, a scan during which the object has been moved could be corrected calculative to get a more precise result.

According to a particularly preferred embodiment of the invention it can be provided that the scanning module is a structured light scanning module.

A structured light scanning module works by projecting a narrow band of light onto a three-dimensionally shaped surface and produces a line of illumination that appears to be distorted from other perspectives than that of the projector. It may be used according to invention to obtain the exact geometric reconstruction of the surface shape of the object. A faster and more versatile method is the projection of patterns consisting of many stripes at once, or of arbitrary fringes, because this allows for the acquisition of a multitude of samples simultaneously. Seen from different viewpoints, the pattern appears geometrically distorted due to the surface shape of the object. Although many other variants of structured light projections are possible and are regarded to be within the scope of the invention, patterns of parallel stripes or a grid are preferably used for the present invention. The displacement of the stripes or the grid allows for an exact retrieval of the 3D coordinates of any details on the object's surface.

It can also be provided that the positioning device is balanced in its mass distribution so that the center of mass of the positioning device or of the system positioning device and object is in a crossing-point where at least two axes around which the positioning device is horizontally rotatable are crossing or within around 10% of the maximum diameter of the positioning device of this crossing-point.

By this means it is possible to rotate the positioning device without or only a low resulting moment of torque acting on the positioning device when in a moved or rotated position. The rotated position of the positioning device is mechanically stabilized by this setting.

According to another preferred embodiment of the invention the positioning device contains a weight or an exchangeable weight by which the center of mass of the positioning device or of the system positioning device and object is moved to or close to a crossing-point where at least two axes are crossing around which the positioning device is rotatable.

By this means it is possible to rotate the positioning device without a resulting moment of torque acting on the positioning device in a moved or rotated position even if the object to be scanned is exchanged. The rotated position is mechanically stabilized by this setting.

Preferably, the position data from the at least one accelerometer is transferred by a wireless technique to the first processing unit. Therefore, it can be provided that the 3D scanner comprises a module for wireless data transfer which is connected to the at least one accelerometer and is arranged to transfer the position data from the accelerometer wireless to a receiver connected and thereby to the first processing unit which is connected to the receiver. The receiver can be arranged on a motherboard carrying the first processing unit.

The first processing unit is preferably a central processing unit.

According to the invention, the positioning device can be realized as a spherical table which is carried in a support structure in which the spherical table can be rotated around three axes. The underside of the spherical table is realized by a spherical surface, in particular by a hemisphere, which can be rotated with respect to the center of the sphere. Of course, the spherical surface of the table is only a spherical area, like the spherical surface of a spherical segment or sector.

According to a preferred embodiment of the invention the positioning device is supported by a ball bearing or at least one ball caster. The ball bearing or the at least one ball caster can be realized by the support structure or by the positioning device itself.

The objects of the invention are also achieved by a method for scanning a surface of an object to acquire three dimensional (3D) coordinates of the surface, preferably making use of an 3D scanner according to in present invention, comprising the following chronological steps A) the object is placed on or fixed to a positioning device;
B) a first position of the positioning device is measured by means of at least one accelerometer;
C) a surface of the object is scanned by a scanning module;
D) the positioning device is rotated at least once relative to the scanning module to at least one second position, preferably by a manual movement of the object or the positioning device;
E) the at least one second position is determined by the at least one accelerometer;
F) a surface of the object is scanned by the scanning module in each of the at least one second positions; and
G) the 3D coordinates data of the surface of the object is obtained by correlating the surface scans in the at least two positions with the positions determined by the at least one accelerometer.

The at least one second position is different to the first position. Preferably, the correlated data is stored in a memory.

In preferred methods, a total 3D coordinate surface data of the object is calculated by superimposing the correlated coordinates of the surface scans in the different positions.

Hereby an easy way of calculating the resulting total 3D coordinates of the surface of the object is used.

Preferably, the method is performed by a 3D sensor according to the invention.

The invention is based on the surprising finding that, by determining the position of a positioning device, to which the object to be scanned is fixed or on which the object to be scanned is placed, relative to a scanning module, which can be designed static, it is possible to scan 3D coordinates of the surface of the object at different angles by using an accelerometer to determine any rotation of the positioning device and thereby measuring a large proportion of the surface of the object. A further advantage is that the scanning module does not need to be movable and thereby can be fixed to the static main body of the 3D scanner. The invention additionally allows to build a manually movable positioning device, which enables the user of the 3D scanner to decide at which angles the object shall be scanned, by measuring the change of position of the positioning device relative to the other parts of the 3D scanner or relative to the static scanning module. Thereby, a low-cost 3D scanner can be built. For small objects, like prosthetic teeth or partial or full dentures or dental impressions or models of an oral cavity of a patient, it is preferred according to the invention to only allow only rotation of the positioning device and only measure at different angles of a rotation around two or three or more axes of the object or the positioning device respectively relative to the scanning module by means of at least one accelerometer. For this purpose, it is preferred to locate the at least one accelerometer as a part of the positioning device. It is possible to measure the 3D coordinates of the surface of the object even if the surface has a complex form like undercuts or holes.

The 3D sensor and the method according to the present invention has the advantage of a reduced complicity of the mechanical structure and the benefit of a usable additional third axis of movement, which improves the scanning accuracy of the object. This effect makes a great impact if the positioning device can be rotated freely in all directions, even if some directions are limited. If the movement is driven manually instead of using motors and control electronics the necessary cost for producing, driving and servicing the 3D scanner is significantly reduced compared to fully automated 3D scanners. In addition, the 3D scanner according to the present invention allows individually selected perspectives for the scanning process and hence optimized scanning procedures which can be adapted to the external form of the object to be scanned and/or the partial surface to be scanned.

According to a preferred embodiment of the invention a movable spherical table is used to realize a positioning device of a 3D scanner according to the present invention. To be precise, a freely movable section of a sphere can be used to realize the positioning device. This movable spherical or sectioned spherical table for the positioning device realizes a platform which in principal has an infinite number of resting positions with respect to six degrees of freedom, which are rotation around the X-, Y- and Z-Axis along with translation in X-, Y- and/or Z-direction, if the support structure bearing the spherical table can be shifted in all three directions. When scanning an object the software program needs a defined starting point and each subsequent position for every additional scan to correctly align the resulting mesh data to calculate the 3D coordinates of the measured surface of the object.

Traditional mechanically mounted sensors like Hall-effect-sensors, some optical sensors and others cannot be mounted nor used because, the positions of the spherical table are infinite and movement of the spherical table requires an uninterruptable spherical geometric surface for the table to function correctly. The addition of an inertial system for tracking position location during scans allows using a spherical geometry for the movement of the scanning model gaining an additional axis of rotation over traditional two axis movement. The position data (the measured 3D coordinates of a single scan) is then passed by cable, WIFI, blue tooth or any other technology to an acquisition software running in the first processing unit for alignment of the mesh data. The spherical table can be actuated manually or automatically using stepper motors or other similar technology.

The goal of measuring the position could have been alternatively achieved by two basic methods. First, mechanical: specific sensors (encoders) are used for each degree of freedom of the movable table. Such embodiments are mechanical complex. Second, optical: some special tags are added to the movable table. The scanning module, such as stereo scanner cameras, recognizes the tags for any table position and a specific software computer calculates the table position. These tags need to be cleaned and visible in any condition by the scanning module. The object to be scanned can occlude the tags and dust can hide them completely or partially, impeding the measurement. Therefore, both methods have certain drawbacks which are overcome the use of the accelerometer according to the present invention.

According to the preferred embodiment a series of integrated electronic circuit boards are mounted inside the spherical table which transmit positional location in 3D space to the scanning computer either wirelessly or via cable. This data is used to correctly align mesh data of the measured coordinates on subsequent scanning.

BRIEF DESCRIPTION OF THE DRAWINGS

Further embodiments of the invention will now be explained with reference to five schematic figures below, however without limiting the invention. Wherein.

DETAILED DESCRIPTION

Figure 1:
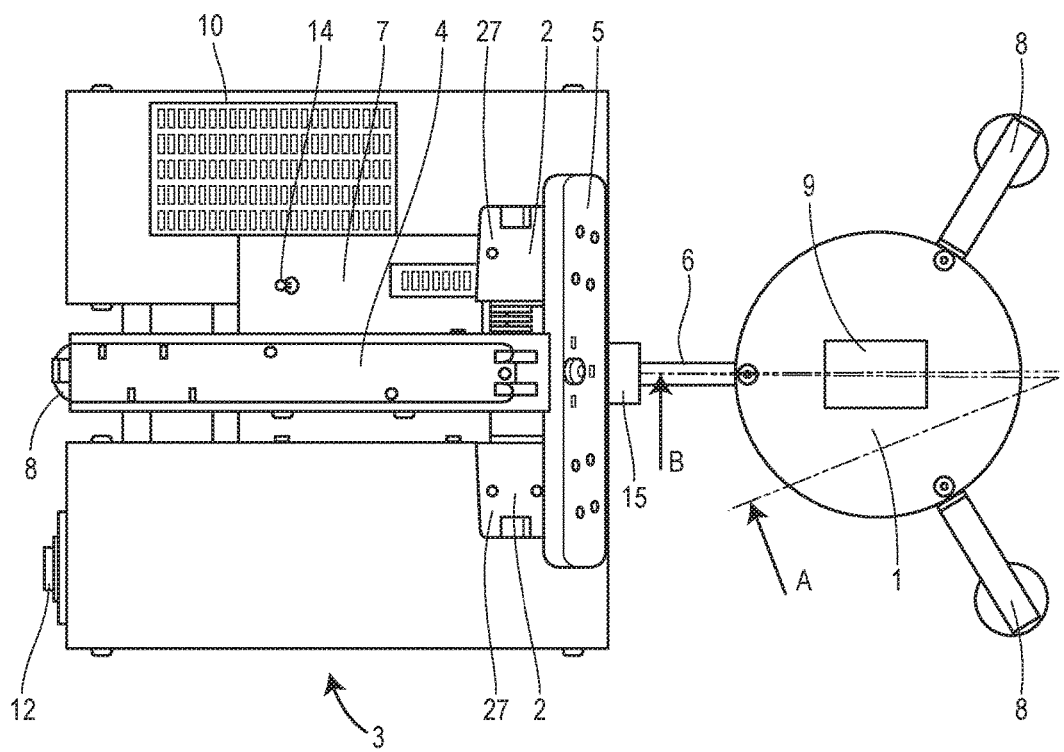
FIG. 1 shows a schematic top view of a 3D scanner according to the invention.
Figure 2:
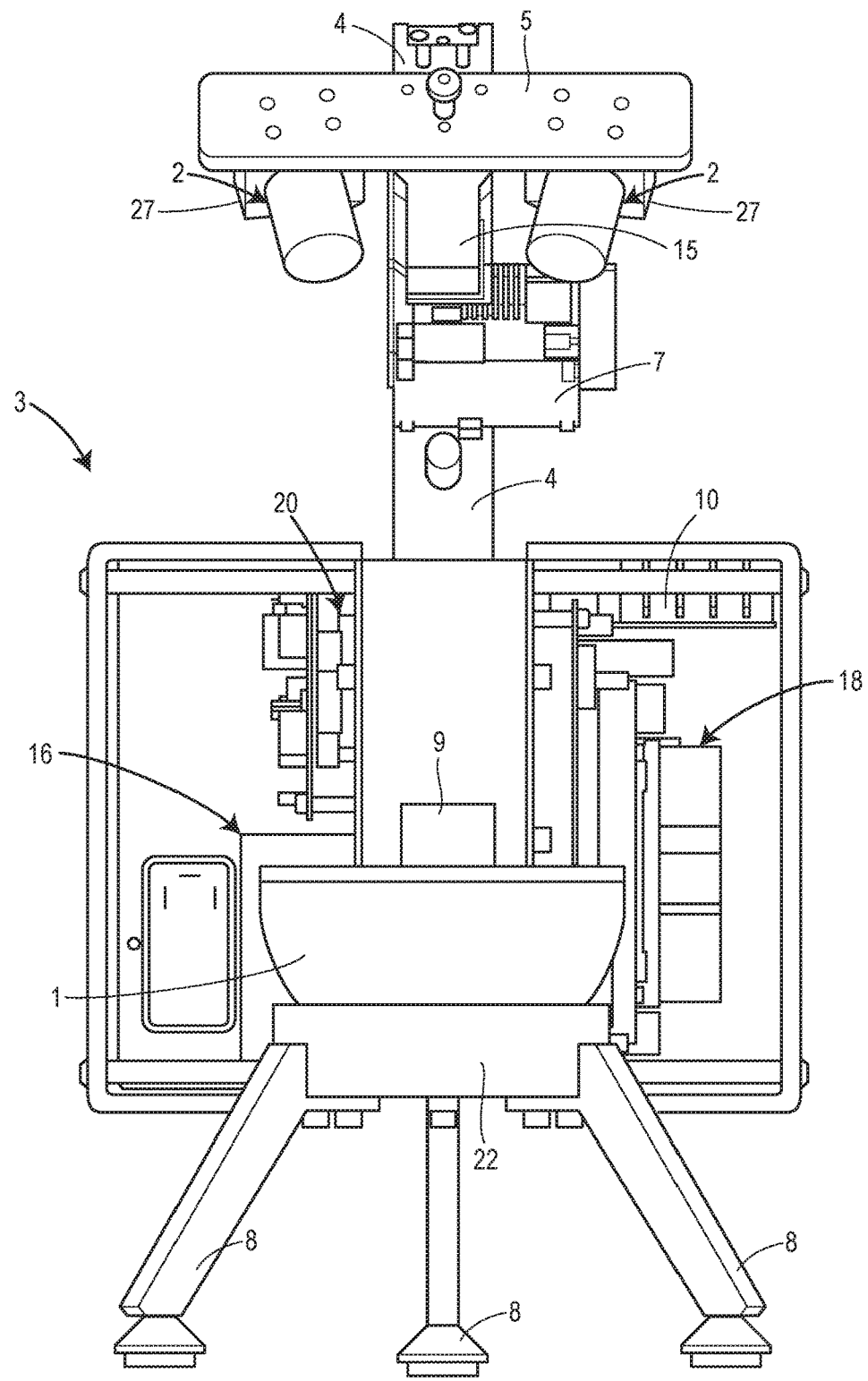
FIG. 2 shows a schematic front side view including a cross-sectional view of the main body of the 3D scanner according to FIG. 1.
Figure 3:
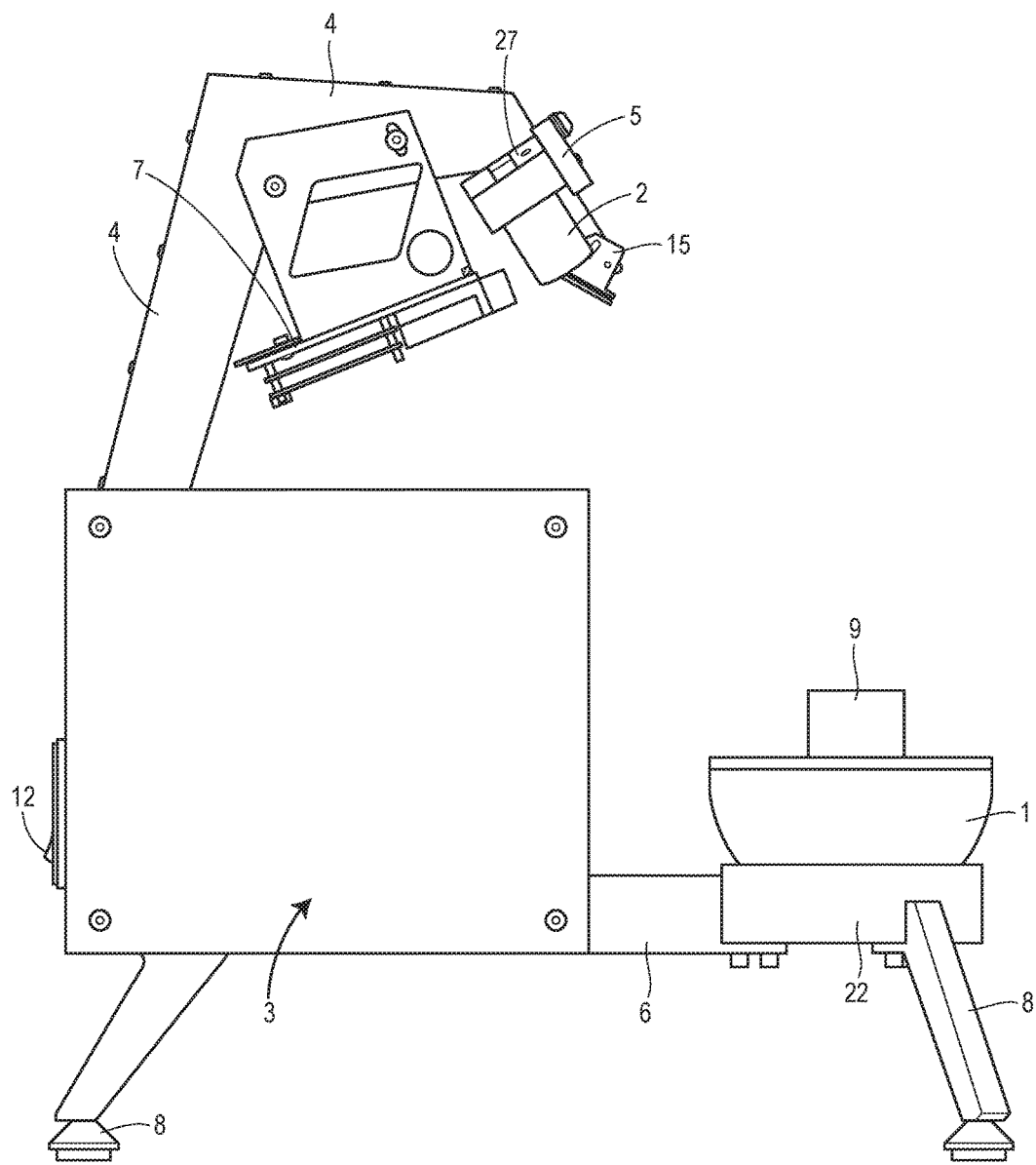
FIG. 3 shows a schematic side view of the 3D scanner according to FIGS. 1 and 2.

FIGS. 1, 2 and 3 show a schematic top view, a front side view and a side view of a 3D scanner according to the invention. The 3D scanner comprises a spherical table 1 which serves as a positioning device. The outer form of the spherical table 1 is in fact not a whole sphere but a half sphere or hemisphere, which can be freely rotated relative to the rest of the 3D scanner around three perpendicular axes. The maximum rotation angle is defined by the upper end (in FIGS. 2 to 5 above, in FIG. 1 outside the image plane in direction of the beholder) of the spherical table 1. A table plate exceeds beyond the spherical surface thereby preventing the spherical table 1 to be rotated around over a maximum of 90° around the two horizontal axes. The 3D scanner also comprises two cameras 2 which are able to record stereo images from the top of the spherical table 1. A main body 3 contains electronic components of the 3D scanner. From the main body 3 a supporting arm 4 and a plate 5 are holding and positioning the cameras 2. Preferably the cameras 2 and therefore the supporting arm 4 and the plate 5 are rigidly connected to the main body 3. Alternatively, the supporting arm 4 might also be linearly shiftable and/or rotatable mounted to the main body 3, to adapt the scanning angle to the scanning purpose.

The spherical table 1 is carried by support structure 22 (see FIGS. 2 and 3) which is rigidly connected to the main body 3 via a strut 6. The spherical table 1 can be rotated around three axes relative to the support structure 22. A projector 7 is connected to the supporting arm 4. The projector 7 illuminates the top of the spherical table 1 with structured light. The cameras 2 and the projector 7 are rigidly fixed to one another via the supporting arm 4 and plate 5. The two cameras 2 and the projector 7 are building a scanning module 2, 7 of the 3D scanner according to the invention. As the projector 7 sends structured light, the scanning module 2, 7 is understood to be a structured light scanning module 2, 7.

The strut 6 carries or supports the spherical table 1 together with two further stands 8. A third stand 8 is fixed to the main body 3 of the 3D scanner. The whole 3D scanner therefore can be placed or mounted stable on the three stands 8 on an even surface. Slight unevenness can be leveled out by adapting the height of the feet of the stands 8. For this purpose, the feet preferably are connected to the arms of the stands 8 via screws and an internal thread.

An object 9 to be scanned is placed on of fixed to the spherical table 1 and can be illuminated by the structured light of the projector 7 thereon. The reflection of the structured light can be measured by the stereo cameras 2 creating a stereo image of the surface of the object 9. Fixing means (not shown) or a magnetic table 1 might be used to fix the object 9 to the spherical table 1 in order to avoid movement of the object 9 relative to the spherical table 1 when moving the spherical table 1 relative to the scanning module 2, 7 in the support structure 22.

A graphic card 10 is used for evaluating the graphic signals from the cameras 2 to generate 3D coordinates of the scanned surface of the object 9. The graphic card 10 includes a 3D graphic chip for this purpose. The graphic card 10 is located inside a housing of the main body 3. In fact, the graphic card 10 can only be seen if the housing of the main body 3 is transparent on the top in the area of the graphic card 10, like shown in FIG. 1.

A first switch 12 is arranged on the backside of the 3D scanner for switching the 3D scanner on and off. A second switch 14 is arranged on the projector 7 for turning the projector 7 or the scanning module 2, 7, which comprises the projector 7 and the cameras 2, on and off separately.

A mirror 15 which is arranged on the supporting arm 4 in between the cameras 2 is used to change the light path from the projector 7 for illuminating the object 9 from a desired angle with structured light. Hereby the projector 7 can be arranged in a practical position without causing an illumination of the object 9 from an unfavorable angle relative to the cameras 2.

FIG. 2 shows a schematic front side view including a cross-sectional view of the main body 3 of the 3D scanner. This allows to look inside the main body 3 and all the electronics therein. Beside the graphic card 10 the main body contains a power supply 16, a motherboard 18 and a hard disk 20 or solid state disk 20 as electronic components. The motherboard 18 carries at least one central processing unit (CPU), which is programmed to execute a method according to the invention or in other word to combine the 3D coordinates from different positions to calculate a resulting set of total 3D coordinates of the surface of the object 9.

Figure 4:
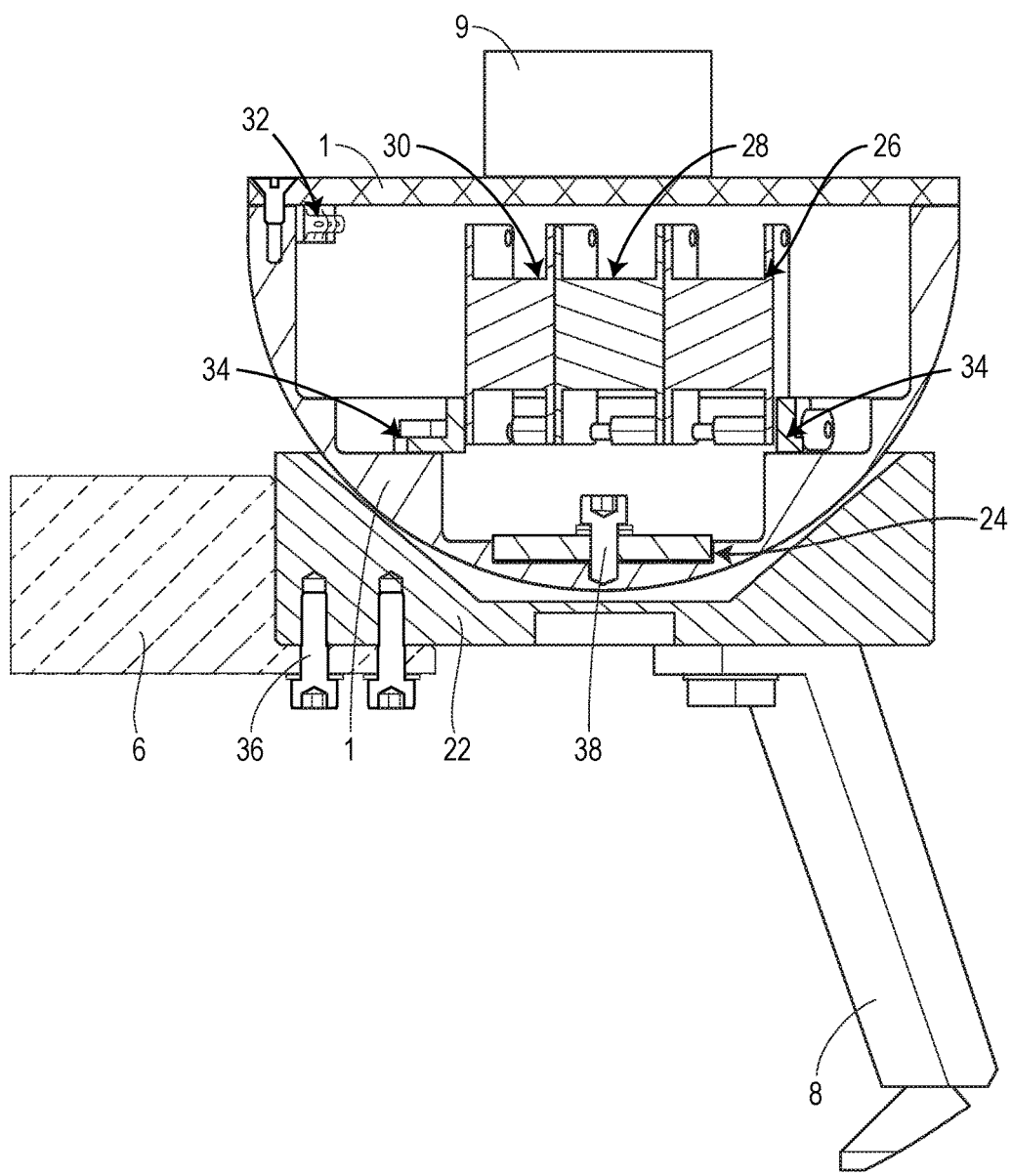
FIG. 4 shows a schematic cross-cut view through the positioning device for the 3D scanner of FIG. 1, along cutting plane B.
Figure 5:
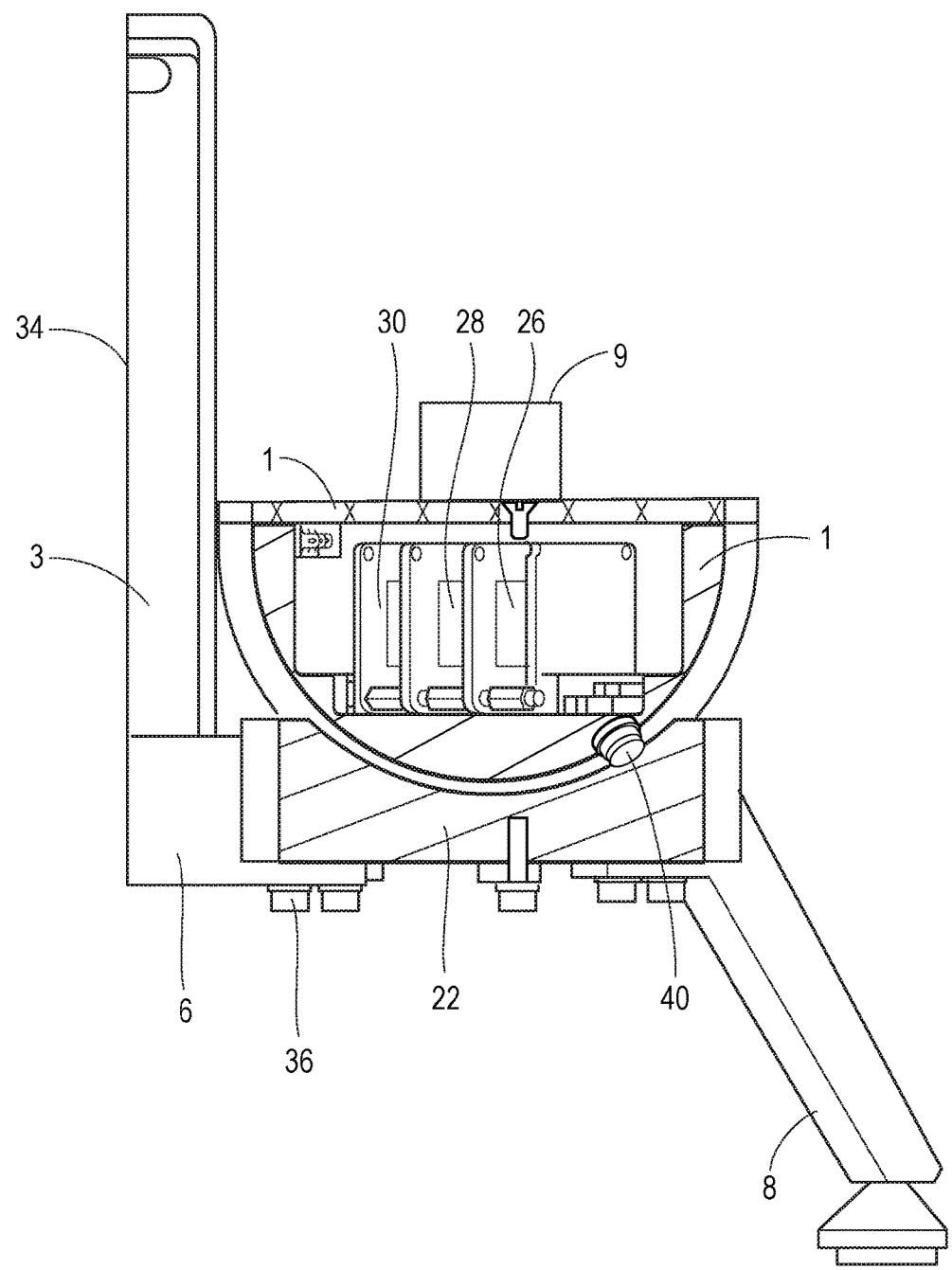
FIG. 5 shows a schematic cross-cut view through the positioning device for the 3D scanner of FIG. 1, along cutting plane A.

FIG. 4 shows a schematic cross-cut view through the positioning device 1 for the 3D scanner. The cutting plane B is shown as line B in FIG. 1. FIG. 5 shows a schematic cross-cut view through the positioning device for the 3D scanner of FIG. 1. The cutting plane A is shown as line A in FIG. 1.

The spherical table 1 contains a weight 24 which transfers the center of mass of the spherical table 1 downward (in FIGS. 2 to 5 below, in FIG. 1 into the image plane). Thereby, the shown central position and all other possible positions of the spherical table 1 are stabilized. This central position is characterized by a plane parallel top surface, on which the object 9 is placed or to which the object 9 is fixed, to the ground level. In other words: the surface of the table 1 is aligned perpendicular to the gravitational force. The weight 24 can be replaced by other weights and/or moved sideways to adapt the center of mass to a different object to be scanned. For this purpose, the weight 24 is fixed by a screw 38 to the spherical table 1. By exchanging the weight 24 one can make sure that the center of mass of the spherical table 1 with the object 9 thereon stays in place independent from the position of the spherical table 1. In other words: By adapting the weight 24 the center of mass of the system table 1 and object 9 can be moved into the center of the sphere defined by the spherical surface of spherical table 1, thereby avoiding any moments of torque on the spherical table 1 if the spherical table is rotated. Hereby, the center of mass of the spherical table 1 or of the system spherical table 1 and object 9 is moved to or close to the crossing-point of the three axes around which the spherical table 1 is rotatable.

Inside the spherical table 1 a gyroscope sensor 26 as accelerometer is mounted. The gyroscope sensor 26 maybe part of an inertial measurement unit (IMU) comprising at least one gyroscope sensor 26 and a linear accelerometer. The gyroscope sensor 26 is able to measure any rotation of the spherical table 1. Furthermore, a power supply 28 and a WIFI module 30 is arranged inside the spherical table 1. The WIFI module 30 is connected to the gyroscope sensor 26 and is able to send the measured changes of the position of the spherical table 1 to the CPU on the motherboard 18 of the main body 3. An optional second accelerometer 27 is located in the scanning module 2, 7 of FIGS. 1-3.

The spherical table 1 has a separate switch 32 by which the power for the table 1 can be switched on and off separately. The spherical table 1 is carried by a support 34 having a hollow recess in which the spherical surface of the spherical table 1 can be rotated freely around the three axes. The support 34 is carried by two of the stands 8 and the strut 6. The support 34 for the spherical table 1 is fixed by two screws 36 to strut 6. The weight 24 is fixed by screw 38 to the inner surface of the spherical table 1. At least one ball caster 40 for the spherical table 1 is mounted acentric to movably support the spherical table 1. The at least one ball caster 40 can also be used for measuring and/or for driving a rotation of the spherical table 1 inside the support structure 22, if the ball caster 40 can be driven by a motor (not shown).

The power supply 16 of the main body 3 supplies power to all other electronic components, to the projector 7, the cameras 2 and power supply 28 of the spherical table 1 together with the support structure 22. The power supply of the spherical table 1 can be built independent from power supply 16 to avoid a limitation or disturbance of the rotation of the movable spherical table 1. For this purpose, a battery or an accumulator can be used as power source. The motherboard 18 carries at least one processing control unit (CPU) and connects the at least one CPU to the graphic card 10 and the hard disk 20 or solid state disk 20, and indirectly to the cameras 2, the projector 7 and the WIFI module 30 of the spherical table 1. The hard disk 20 or solid state disk 20 allows to store all data temporarily and permanently. This data can be for example raw data from the cameras 2 as well as processed 3D coordinates of the object calculated by the CPU from these raw dates, taking the rotational alignment measured by the gyroscope sensor 26 or the rotational and linear alignment measured by the IMU into account. Therefore, the main body 3 can be regarded as a computer system of the 3D scanner.

A measurement of the surface of the object 9 can be performed according to the following example: The object 9 is placed on or fixed to the upper flat surface of the spherical table 1. The position of the object 9 and the spherical table 1 remains unchanged at first and defines the first position of the object 9. The starting position is measured by the gyroscope sensor 26 or the IMU containing at least one gyroscope sensor 26 and the information is transferred by transmitting the data by the WIFI module to a receiver (not shown) which is connected to the motherboard 18 and thereby to the CPU on the motherboard 18. The projector 7 illuminates the object 9 with structured light. The cameras 2 receive the reflected light from two different angles. The graphic card 10 calculates the 3D coordinates of illuminated surface of the object 9 in the first position of spherical table 1. These 3D coordinates are stored together with the position data to the hard disk 20 or solid state disk 20.

The position of the spherical table 1 is changed by pivoting, tilting or rotating the spherical table 1 and thereby the object 9 thereon. The change of the position is measured by the gyroscope sensor 26 or the IMU. The change of position can be driven manually or by driving the at least one ball caster 40 or by using motors (not shown). As soon as the table 1 stops moving or started by a manually or automatically created signal a second position of the spherical table 1 and the object 9 thereon is reached and the second position is measured by the gyroscope sensor 26 or the IMU and the data is transferred by the WIFI module 30 as described above. The surface of the object 9 in the second position is illuminated by the projector 7 and the reflected light from the object 9 is recorded by the cameras 2 and the surface coordinates of the object 9 in the second position are generated as described above and stored on the hard disk 20 or solid state disk 20 together with the new position data. The measurement can be repeated likewise for one or more additional positions of table 1 and object 9.

The CPU on the motherboard 18 calculates a combined and final set of 3D coordinates of the surface of the object by combining the 3D coordinates stored on the hard disk 20 or solid state disk 20 and taking the different positions of the object into account, as if the scanning module 2, 7 would have been moved around the object 9 likewise. The combined set of 3D coordinates is saved to the hard disk 20 or solid state disk 20 and/or is transmitted to an external computer (not shown) for continued use. Preferably, the combined set of 3D coordinates is stored and/or send in a CAD-format which can be used for CAD-CAM-Systems.

The features of the invention disclosed in the above description, the claims, figures, and exemplary embodiments can be essential both individually and in any combination for implementing the various embodiments of the invention.

LIST OF REFERENCE SYMBOLS

1 Positioning device/Spherical table
2 Camera/Scanning module
3 Main body
4 Supporting arm
5 Plate
6 Strut
7 Projector/Scanning module
8 Stand
9 Object
10 Graphic card/Electronics
12 Switch
14 Switch
15 Mirror
16 Power supply
18 Motherboard
20 Hard disk/Solid state disk
22 Support structure
24 Weight
26 Gyroscope sensor/Accelerometer
28 Power supply module
30 WIFI module
32 Switch
34 Support for sensor
36 Screw
38 Screw
40 Ball caster for positioning device

The invention claimed is:

1. 3D scanner comprising:
at least one scanning module for acquiring three-dimensional (3D) coordinates of a surface of an object, and
a positioning device on which the object is placeable or fixable, whereby the positioning device is movable relative to the at least one scanning module,
the 3D scanner further comprising:
a first accelerometer, which is configured to measure a change of the position of the positioning device relative to the scanning module, and
a first processing unit which is connected to the at least one scanning module and to the positioning device for receiving data,
whereby the first accelerometer is located in the positioning device or the first accelerometer is located in the positioning device and a second accelerometer is located in the scanning module.

2. 3D scanner according to claim 1, wherein the positioning device is rotatably mounted around two or three different axes relative to the scanning module and the first accelerometer is configured to measure the rotation of the positioning device around these axes relative to the scanning module.

3. 3D scanner according to claim 1, wherein the first accelerometer is at least one gyroscope sensor.

4. 3D scanner according to claim 1, wherein the first accelerometer is configured to measure any change of the of the position of the positioning device relative to the scanning module along defined and set degrees of freedom.

5. 3D scanner according to claim 1, wherein the first processing unit or a second processing unit is configured:
  (a) to correlate the acquired 3D coordinates from the scanning module with position data received from the first accelerometer, or
  (b) to correlate the 3D coordinates of different positions of the object with one another, or
  (c) to calculate a combination of 3D coordinates by superimposing the acquired 3D coordinates of the object in different positions and by taking the change of the position of the object into account.

6. 3D scanner according to claim 5, wherein the 3D scanner further comprises a memory element in which the correlated data is stored and the first or second processing unit is configured to calculate a total surface of the object by matching the acquired coordinates of the surface of the object with respect to change of position data measured by the first accelerometer.

7. 3D scanner according to claim 1, wherein the positioning device is shiftable along two different directions or along three different directions relative to the scanning module and the 3D scanner comprises a linear accelerometer which is configured to measure the change of the position of the positioning device caused by translation of the positioning device relative to the scanning module and a gyroscope sensor as one of the first accelerometer which is configured to measure the change of an angle of the positioning device caused by rotation of the positioning device relative to the scanning module.

8. 3D scanner according to claim 1, wherein the 3D scanner is a 3D dental scanner and at least one of a prosthetic tooth, a set of prosthetic teeth, a partial denture, a full denture, a denture base, a dental impression, and a model of a part of an oral cavity of a patient is the object and is placeable on or fixable to the positioning device.

9. 3D scanner according to claim 1, wherein the positioning device is manually rotatable or rotatable and linearly movable relative to the scanning module or the positioning device is manually rotatable or rotatable and linearly movable along preset degrees of freedom relative to the scanning module.

10. 3D scanner according to claim 1, wherein the 3D scanner does not comprise an actuator to move the positioning device relative to the scanning module.

11. 3D scanner according to claim 1, wherein the 3D scanner further comprises a timer and the first processing unit is configured to determine if there is a movement of the positioning device relative to the scanning module or if this movement exceeds a predefined angular velocity limit and/or a predefined linear velocity limit by determining the change of the position measured by the at least one accelerometer or an inertial measurement unit comprising the first accelerometer.

12. 3D scanner according to claim 1, wherein the first processing unit is configured to start and stop a scanning process and/or to determine if the 3D coordinates of the object are stored or not stored in a memory, based on a determination of a movement of the positioning device.

13. 3D scanner according to claim 1, wherein the scanning module is a structured light scanning module.

14. 3D scanner according to claim 1, wherein the positioning device is balanced in its mass distribution so that a center of mass of the positioning device or of the system positioning device and object is in a crossing-point where at least two axes around which the positioning device is horizontally rotatable are crossing or within around 10% of a maximum diameter of the positioning device of this crossing-point.

15. 3D scanner according to claim 1, wherein the positioning device contains a weight or an exchangeable weight by which a center of mass of the positioning device or of the system positioning device and object is moved to or close to a crossing-point where at least two axes are crossing around which the positioning device is rotatable.

16. Method for scanning a surface of an object to acquire three dimensional coordinates of the surface, the method comprising the following sequential steps:
   placing the object on or fixing the object to a positioning device on which the object is placeable or fixable, whereby the positioning device is movable relative to the at least one scanning module;
   measuring a first position of the positioning device by a first accelerometer;
   scanning the surface of the object by a scanning module for acquiring three-dimensional (3D) coordinates of the surface of the object;
   rotating the positioning device at least once relative to the scanning module to a second position, and determining the second position by the first accelerometer;
   scanning the surface of the object by the scanning module in the second position; and
   obtaining 3D coordinates data of the surface of the object by correlating the surface scans in the first and second positions with positions determined by the first accelerometer, wherein
the method is performed using a 3D sensor, the 3D sensor comprising:
   the scanning module for acquiring three-dimensional (3D) coordinates of the surface of an object, and
   the positioning device on which the object is placeable or fixable, whereby the positioning device is movable relative to the scanning module, and
the 3D scanner further comprising:
   the first accelerometer, which is configured to measure a change of the position of the positioning device relative to the scanning module, and
   a first processing unit which is connected to the at least one scanning module and to the positioning device for receiving data,
   whereby the first accelerometer is located in the positioning device or the first accelerometer is located in the positioning device and a second accelerometer is located in the scanning module.

17. Method according to claim 16, comprising calculating a total 3D coordinate surface data of the object by superimposing correlated coordinates of the surface scans in the first and second positions.

18. 3D scanner according to claim 2, wherein the positioning device is rotatably mounted around two perpendicular axes or around three perpendicular axes relative to the scanning module and the first accelerometer is configured to measure the rotation of the positioning device around the axes relative to the scanning module.

19. Method according to claim 16, comprising rotating the positioning device at least once relative to the scanning module to the second position by a manual movement of the object or the positioning device.

* * * * *